(12) United States Patent
Newbill

(10) Patent No.: US 6,659,318 B2
(45) Date of Patent: Dec. 9, 2003

(54) SPARE WHEEL CARRIER

(76) Inventor: Anthony J. Newbill, P.O. Box 21360, Wickenburg, AZ (US) 85358

( * ) Notice: Subject to any disclaimer, the term of this patent is extended or adjusted under 35 U.S.C. 154(b) by 158 days.

(21) Appl. No.: 09/951,220

(22) Filed: Sep. 14, 2001

(65) Prior Publication Data

US 2002/0040917 A1 Apr. 11, 2002

Related U.S. Application Data

(63) Continuation-in-part of application No. 09/684,081, filed on Oct. 10, 2000, now abandoned.

(51) Int. Cl.[7] .................................................. B60R 9/00
(52) U.S. Cl. ........................ 224/503; 224/282; 224/512; 224/42.21; 224/42.24; 224/553; 414/465
(58) Field of Search ................................ 224/282, 489, 224/503, 509, 512, 42.12, 42.21, 42.24, 42.25, 42.28, 553; 296/37.2; 414/463, 464, 465, 466

(56) References Cited

U.S. PATENT DOCUMENTS

| 1,472,983 | A | * | 11/1923 | Lawrence | 414/463 |
|---|---|---|---|---|---|
| 1,864,829 | A | * | 6/1932 | Kennedy et al. | 414/464 |
| 2,801,780 | A | * | 8/1957 | Dall | 224/42.21 |
| 3,019,928 | A | * | 2/1962 | Mullins | 414/463 |
| 3,613,971 | A | * | 10/1971 | Betz | 224/486 |
| 3,669,326 | A | * | 6/1972 | Podraza | 224/42.21 |
| 3,753,520 | A | * | 8/1973 | Bodde | 224/503 |
| 3,822,814 | A | * | 7/1974 | Baldi | 224/502 |
| 4,155,472 | A | * | 5/1979 | Dansbury | 414/466 |
| 4,278,191 | A | * | 7/1981 | Mecham | 224/42.21 |
| 4,561,575 | A | * | 12/1985 | Jones | 224/42.21 |
| 4,767,038 | A | * | 8/1988 | McVicar | 224/505 |
| 5,104,015 | A | * | 4/1992 | Johnson | 224/401 |
| 5,186,371 | A | * | 2/1993 | Jozefczak et al. | 224/42.21 |
| 5,333,766 | A | * | 8/1994 | Fisher | 224/42.21 |

* cited by examiner

Primary Examiner—Stephen K. Cronin
(74) Attorney, Agent, or Firm—James D. Givnan, Jr.

(57) ABSTRACT

A spare tire carrier for securement to an end segment of a vehicle bumper and having a swingable arm for travel about horizontal and vertical axes to relocate a spare tire away from the rear of a vehicle and subsequently downward into ground contact. A bracket on a bumper attached mounting plate pivotally carries an arm actuator including oppositely threaded shafts and a sleeve thereon. A ratchet drive imparts rotational movement to the sleeve in a selected direction to either lift or lower the arm and spare tire thereon in a controlled manner and additionally prevents random vertical movement of the arm during vehicle travel. Locks engageable with the bracket and the arm prevent horizontal and upright travel of the arm when the vehicle is underway. The carrier may include a bracket, attachable to a hitch or vehicle frame, with a base plate at its outer end to support the carrier mounting plate. A modified preferred carrier includes an electrical linear actuator to control the carrier arm. The arm is secured by a latch assembly with multiple locks. A support block on the arm facilitates wheel positioning.

17 Claims, 4 Drawing Sheets

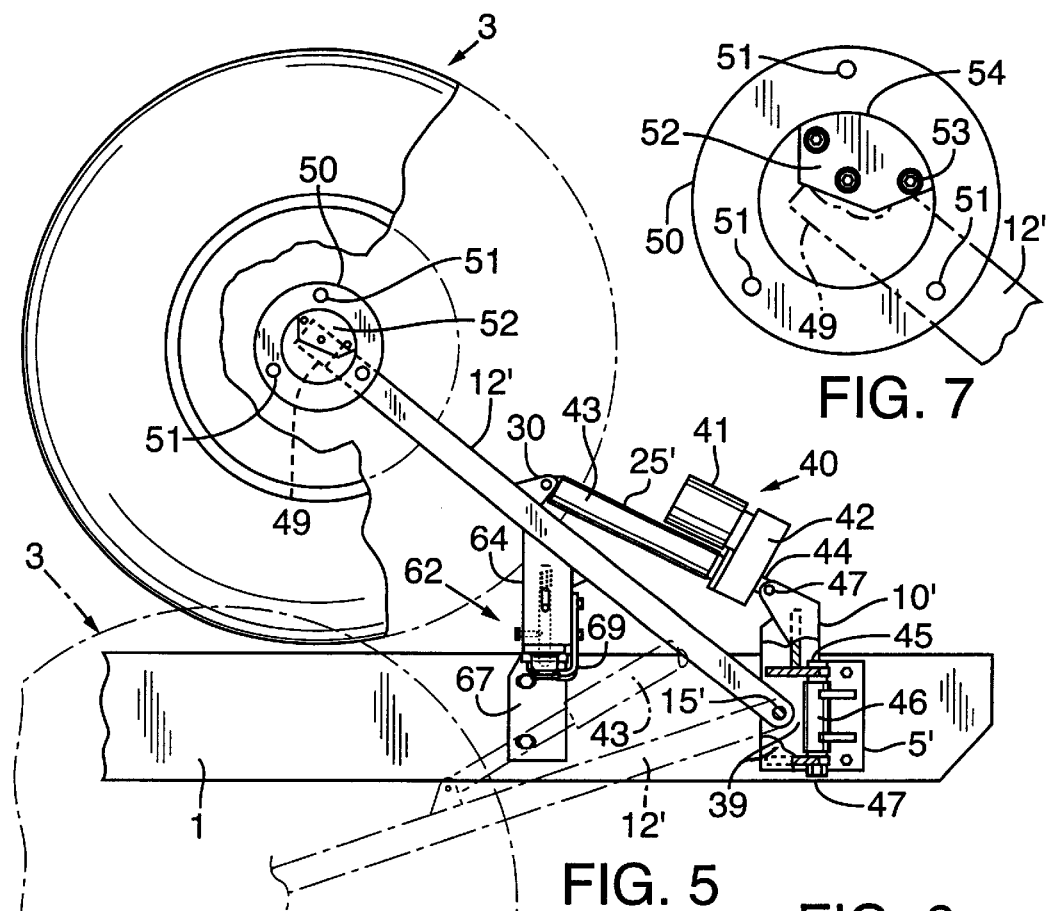
FIG. 5
FIG. 7
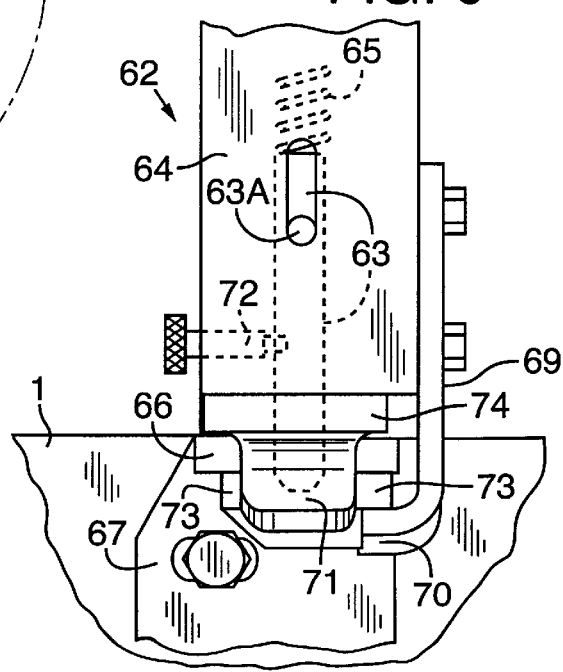
FIG. 6

US 6,659,318 B2

SPARE WHEEL CARRIER

This is a continuation-in-part of U.S. patent application Ser. No. 09/684,081 filed Oct. 10, 2000 now abandoned.

BACKGROUND OF THE INVENTION

The present invention pertains to carriers supporting a spare wheel at the rear of a vehicle, as for example, a sports utility vehicle.

Vehicles of the above mentioned type present a problem when a tire must be changed as such vehicles normally are equipped with tires of a size and weight significantly greater than that of a full size automobile. In many instances a vehicle operator must accordingly rely on assistance in an emergency tire changing operation. While the term tire changing is used it is intended that in fact it is the wheel and tire mounted thereon that are changed. The spare tire and wheel are often carried externally at the rear of a sports utility vehicle with the wheel center approximately four feet above the ground, which with its weight makes its removal from the vehicle an arduous task at best for most motorists.

U.S. Pat. No. 5,104,015 shows a bumper mounted carrier which swings away from the rear of the vehicle and then downwardly towards a ground surface and necessitates some lifting of wheel assembly.

U.S. Pat. No. 4,679,717 discloses a spare wheel assembly carrier mounted on a rear bumper and which swings horizontally away therefrom without lowering of the wheel assembly to ground level, i.e., still requires lifting and lowering of the wheel assembly.

U.S. Pat. No. 5,183,192 shows a spare tire lowering apparatus with a first frame swingable away from the vehicle about an upright axis and a second frame which swings about a horizontal axis to lower a spare tire to the ground. The unit is not bumper mounted.

U.S. Pat. No. 4,561,575 discloses a trailer hitch carried spare tire carrier with a post 34 swingable about a vertical axis and then a horizontal axis to lower a spare tire and wheel to a ground surface. The user must physically maneuver the spare tire and supporting post into both raised and lowered positions.

U.S. Pat. No. 4,717,054 shows a spare tire carrier positionable about a horizontal axis; parallel to a bumper, and into ground contact. A gas charged strut at 52 aids in lifting and lowering the spare tire. A lock at 100 must be inserted into place prior to spare tire removal to prevent rapid return of pivotal upright frame members 40b and 40c to a travel position.

U.S. Pat. No. 5,967,389 is of interest in that it discloses a spare wheel rack having arms swingably carried by a post in turn supported by an end of a cross tube located subjacent one end of a rear bumper.

SUMMARY OF THE PRESENT INVENTION

The present invention is directed toward a wheel assembly or spare tire carrier that facilitates lifting and lowering a vehicle wheel assembly in a controlled manner by utilization of a screw drive.

A mounting plate in place on the rear bumper carries a plate or weldment positionable about an upright pivot. An upwardly inclined arm supported by the weldment carries at its outer end the spare wheel assembly. An actuator for the arm, in one form of the invention, acts on aligned threaded shafts to lower or lift the arm and the spare wheel assembly thereon. The actuator includes a ratchet assembly to impart incremental rotation to a threaded sleeve to extend or retract the arm toward and away from a ground surface. Locking means are provided to control swinging motion of the pivotally mounted bracket. The arm is further confined against vertical movement by a rest therefor and by the actuator. Operation of the actuator lifts and lowers the arm and wheel assembly thereon at all times in a controlled and safe manner. Alternative mounting structure includes a base plate and a bracket attachable to a vehicle frame member.

A modified form of the invention utilizes a linear actuator powered by a motor driven off the vehicle electrical system. A spring driven pin locks the arm in a vehicle travel position adjacent the vehicle bumper while a catch prevents upward separation of the pin when negative loads are imparted to the arm. A modified bracket inhibits swinging of the arm about a hinge pin axis subsequent to unlatching of the arm when the parked vehicle is other than horizontal.

Important objectives include the provision of a spare wheel assembly carrier enabling the safe lifting and lowering of the assembly from and to a ground surface without requiring physical effort beyond that of the typical male or female user; the provision of a spare tire carrier that lifts and lowers a spare tire at all times controlled by an actuator preventing sudden movement of the arm carrying a spare tire assembly which may in some vehicles exceed 150 pounds; the provision of a spare tire carrier that initially moves in a horizontal plane with locks limiting such movement; the provision of a spare tire carrier not reliant on complex mechanisms of costly construction; the provision of a spare tire carrier that utilizes arm control means to provide adequate leverage for convenient lowering and raising the spare tire; the provision of a spare tire carrier using a threaded shaft and means for imparting rotation to the shaft and axial displacement of a nut element to extend or retract a tubular shaft endwise coupled to a carrier lift arm.

BRIEF DESCRIPTION OF THE DRAWINGS

In the accompanying drawings:

FIG. 5 is an elevational view of a modified form of the spare wheel carrier;

FIG. 6 is an enlarged fragmentary view of a lock mechanism on the arm of the spare wheel carrier.

FIG. 7 is an elevational fragmentary view of a wheel support with a guide therein facilitating wheel rotation during wheel installation on the carrier lift arm.

DETAILED DESCRIPTION OF THE PREFERRED EMBODIMENTS

Figure 1:
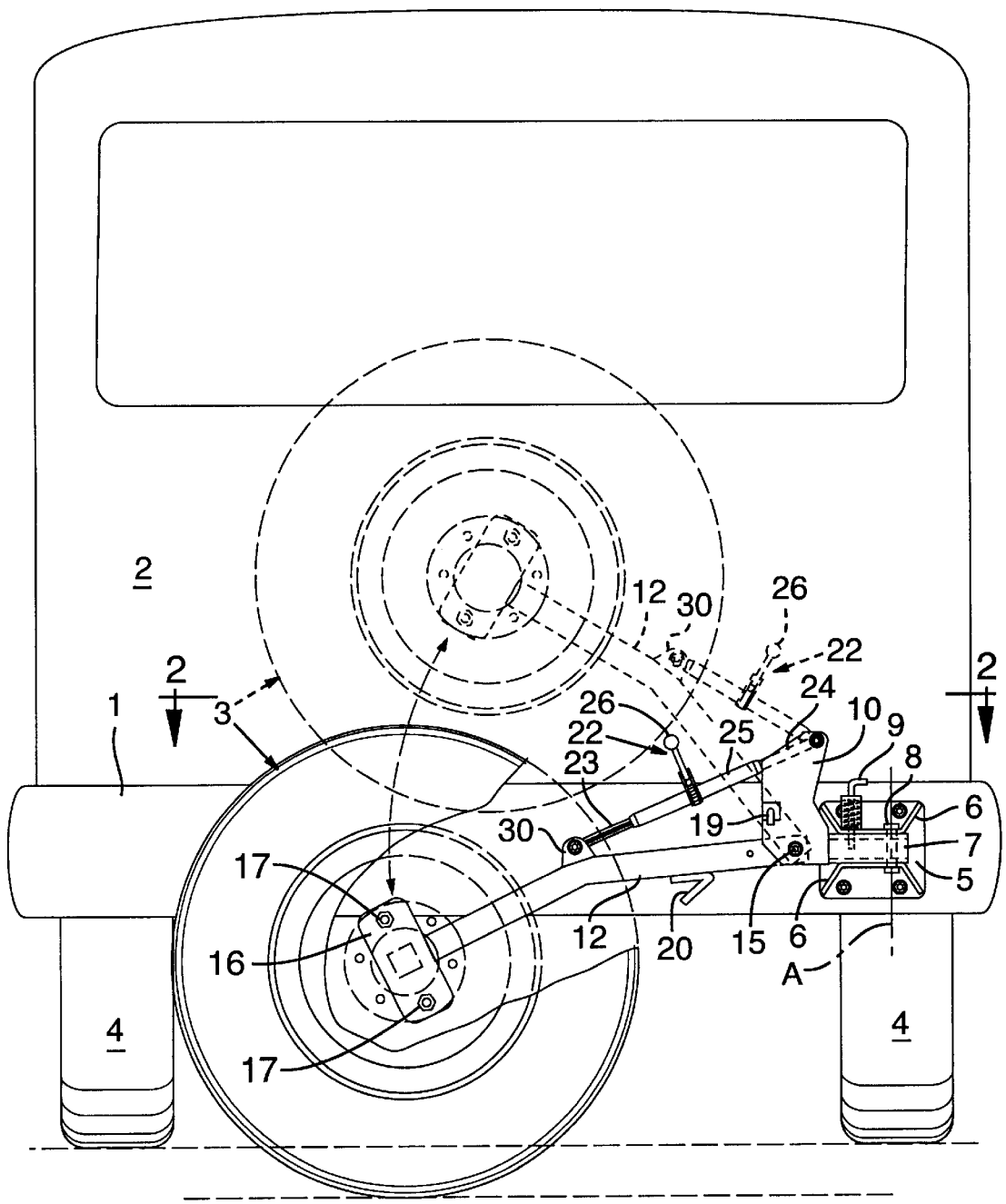
FIG. 1 is an elevational view of the rear end of a vehicle equipped with one form of the present spare wheel carrier.
Figure 2:
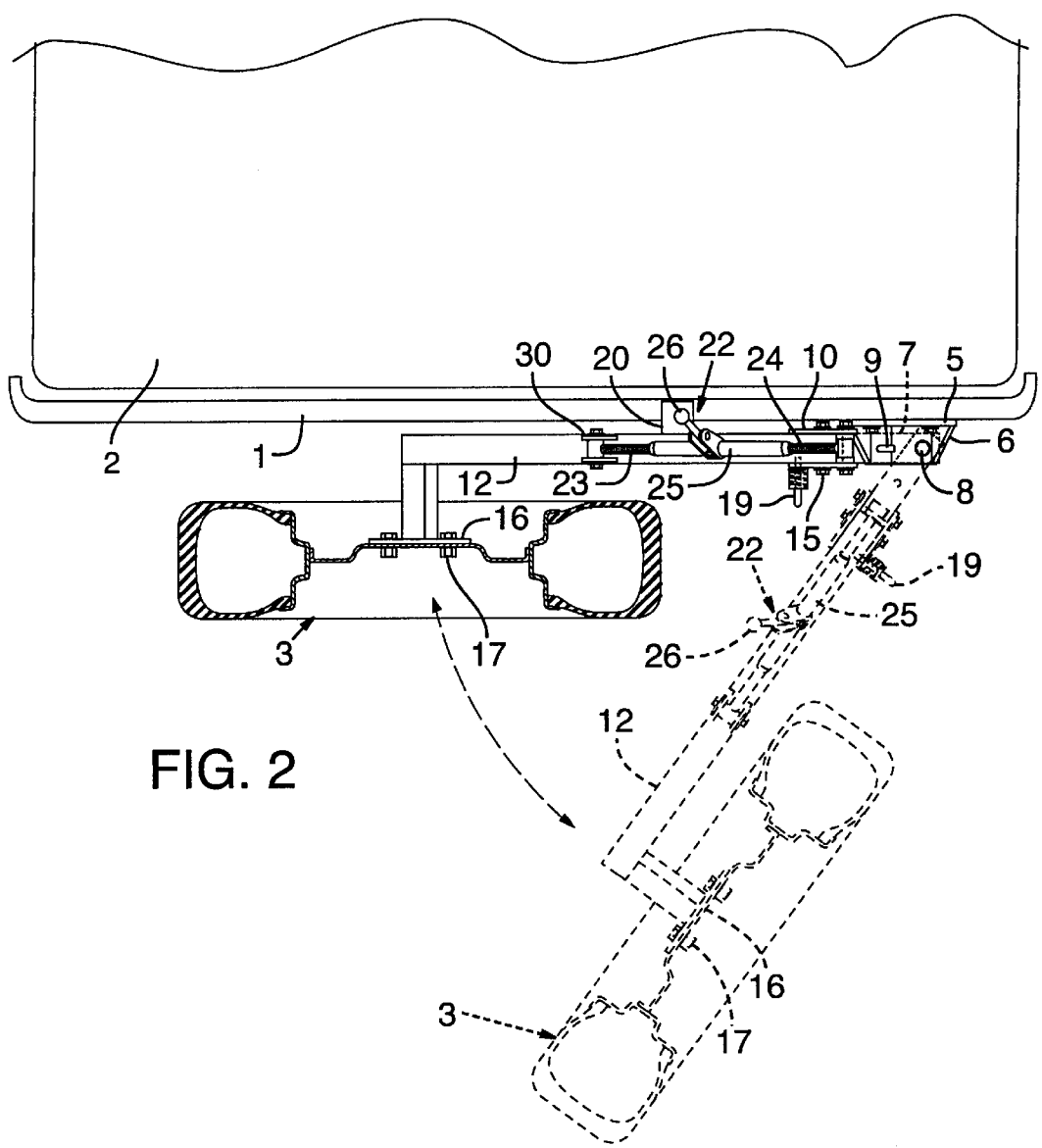
FIG. 2 is a horizontal view taken downwardly along line 2—2 of FIG. 1.

With continuing attention to the drawing wherein applied reference numerals indicate parts similarly hereinafter identified, the reference numeral 1 indicates generally the rear bumper of a sports utility vehicle or other vehicle which carries a spare wheel assembly generally at 3 adjacent the back 2 of the vehicle. Rear wheels are at 4.

A mounting plate at 5 of the present carrier provides a clevis 6 in which a box beam 7 is carried. A pivot pin is at 8. A lock pin 9 limits travel of box beam 7 and a bracket 10 thereon about an upright axis A. An aperture in clevis 6 receives lock pin 9 permitting retention of the bracket and box beam against horizontal swinging movement.

Bracket 10 is of parallel plate construction and carried by box beam 7. A wheel assembly support arm at 12 is swingably attached at 15 to bracket 13 and terminates at its distal end in a cross member 16 apertured to receive bolts 17 extending through lug nut openings in wheel assembly generally at 3. A rest 20 on the arm abuts against the uppermost surface of a vehicle bumper 1 when the arm 14 is raised and positioned forwardly to a travel position.

Arm control means generally at 22 in one form includes threaded shafts 23–24 with oppositely inclined threads engaged with an interiorly threaded sleeve 25. A ratchet drive for the sleeve includes a handgrip 26 and a pawl 27 manually settable to reversibly engage ratchet teeth 28 for extension and retraction of shafts 23–24. Shafts 23–24 are pivotally coupled respectively to a gusset 30 on arm 14 and to bracket 10. Extension of the shafts by the arm control means will lower arm 12 for contact of the tire tread with a ground surface S subsequent to the arm being rearwardly displaced slightly to unseat rest 20 from bumper 1. A bracket mounted lock at 19 is insertably engageable with an aperture in arm 12 to lock same in a travel position.

Lifting of a spare wheel assembly entails securement of same to cross member 16 whereupon the arm control sleeve 25 is rotated in an opposite direction to raise arm 12 and ultimately to position rest 20 on the uppermost surface of the bumper. During vehicle travel over-the-road arm 12 is restricted against movement about pivot 15 by the arm control means as well as lock 19.

Figures 3, 4:
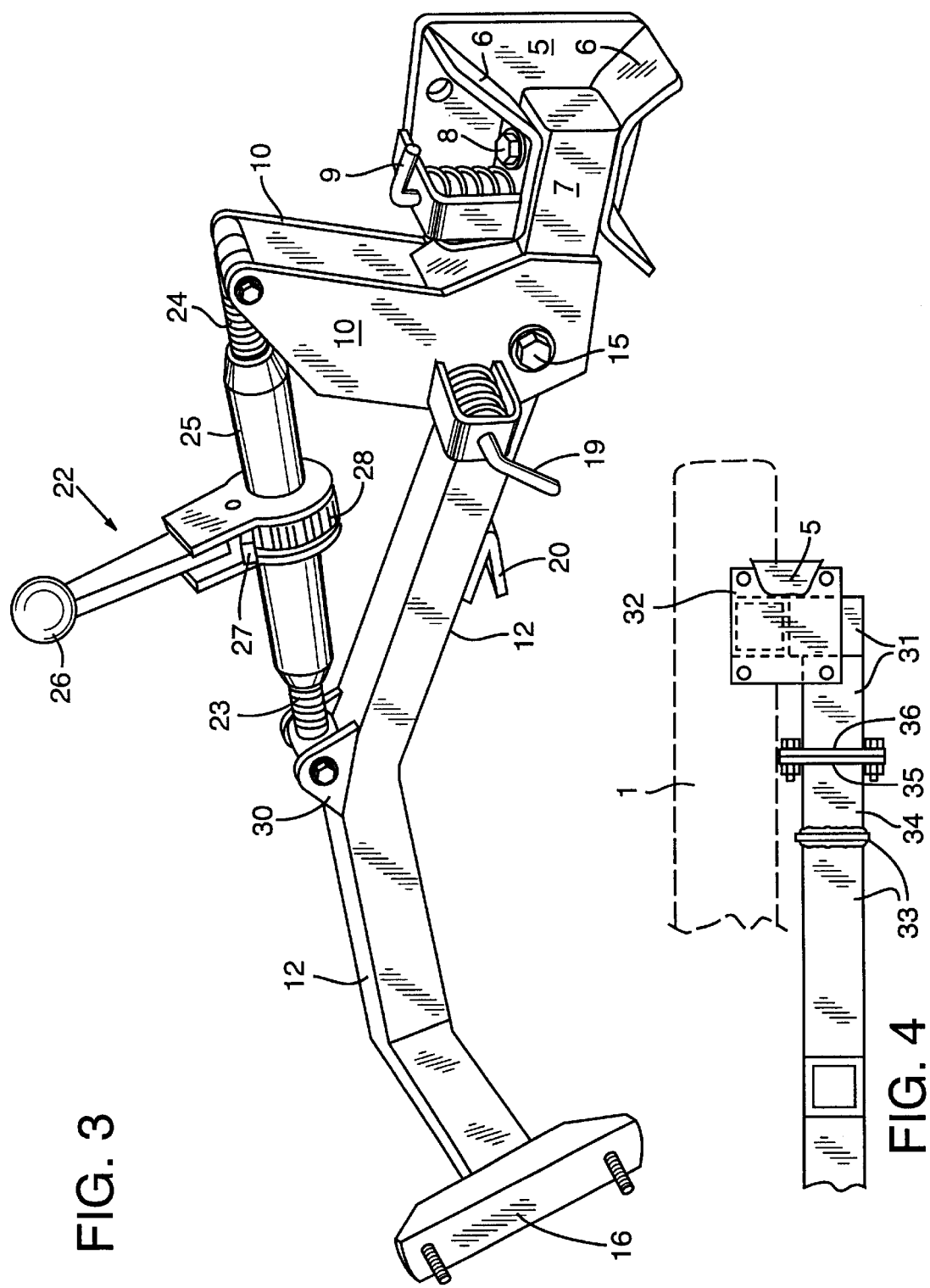
FIG. 3 is a perspective view of the carrier removed from the vehicle and with the wheel assembly removed.
FIG. 4 is a fragmentary elevational view of alternative mounting structure adjacent a vehicle rear bumper.

Mounting plate 5, if so desired, may be attached to a vehicle frame member or the frame of a receiver type trailer hitch A bracket 31 carries a base plate 32 to which is secured mounting plate 5 of the present tire carrier as by threaded fasteners. The bracket passes forwardly below bumper 1 of the vehicle in an inclined manner and hence laterally toward a hitch frame member at 33. To facilitate attachment in a removable manner to the frame member, a tubular extension 34 is provided with an apertured plate 35 to which is bolted a bracket mounted plate 36. Such an installation renders the carrier detachable while avoiding modification of a vehicle bumper. While a receiver hitch frame is shown in FIG. 4, it will be apparent that the bracket may be attached directly to the frame of the vehicle.

In FIG. 5, a spare wheel carrier generally at 40 is shown in which an arm 12' is vertically positioned by arm control means at 25' which may be termed a linear actuator, and includes a motor 41 and a gearbox 42. Linear actuators, per se, are well known in the field of electromechanical devices. For present purposes the actuator preferably include a ball screw assembly in a tubular housing 43. A fitting 44 and pin 47 couples the linear actuator to a clevis formed by parallel plate 39 of a bracket 10' which is swingably carried by a pivot pin 45 and sleeve 46, the latter in place on a mounting plate 5'. Frictional engagement of the pin and sleeve prevent random movement of arm 12' about the axis of pin 45 upon tightening of a nut 47. Motor 41 is powered by the vehicle electrical system through a switch not shown in a circuit that preferably includes limit switches. A suitable linear actuator is manufactured by Thompson Saginaw under model No. PPA23. An arm mounted clevis is at 30.

A latch assembly generally at 62 includes a bolt 63 slidably housed at 64 and biased downwardly by a compression spring 65 which seats the lower end of bolt 63 through an opening in a flange 66 on a bumper mounted plate 67. A catch 69 on housing 64 includes a flange 70 which secures carrier arm 10' against vertical displacement during vehicle travel while seated bolt 63 prevents arm swinging about the axis of pin 45. A bolt handle is at 63A. A lip 71 on plate 67 serves to bias bolt 63 upwardly during return of raised arm 12' proximate the back end of the vehicle. A spring loaded retainer pin 72 seats in bolt 63 to lock the bolt during vehicle travel. Anti-friction blocks 73–74 facilitate opening and closing movement of the latch assembly. In FIG. 7, the outer end of arm 12' terminates in a right angular arm segment 49 which in turn terminates in welded securement to a plate 50 on which threaded studs 51 are carried to receive the wheel of a spare tire assembly after which vehicle lug nuts are installed to secure the assembly to plate 50. As some spare tire assemblies. i.e., wheel and tire, may exceed 150 pounds, it is highly desirable to provide a support block at 52 on plate 50 as by recessed fasteners 53. The block is of a high density, low friction synthetic material with an arcuate surface 54 which is of a depth to safely rotatably support a spare tire assembly while the user aligns the wheel openings with threaded studs 51 prior to placement on the studs.

Operation of the present carrier is believed apparent from the foregoing description.

While I have shown but one embodiment of the spare wheel carrier, it will be apparent to those skilled in the art that the invention may be embodied still otherwise without departing from the spirit and scope of the claimed invention.

Having thus described the invention, what is desired to be secured by a Letters Patent is:

1. A spare tire carrier including;
   a mounting plate for attachment to a vehicle,
   a bracket carried by said mounting plate for travel about a vertical axis,
   an arm pivotally coupled to said bracket and having a wheel engageable member at its distal end, and
   arm control means for lowering and raising said arm and including threaded shafts, a threaded sleeve, means for imparting rotation to the sleeve to simultaneously extend or retract said shafts to lower and raise said arm and the wheel engageable member at the end of said arm.

2. The spare tire carrier claimed in claim 1 wherein said means for imparting a rotation to the sleeve includes a ratchet mechanism.

3. The spare tire carrier claimed in claim 1 wherein said mounting plate is apertured, a pin inserted into aperture and located in the path of said bracket to limit bracket travel about the vertical axis.

4. The spare tire carrier claimed in claim 1 wherein said arm includes a rest engageable with a vehicle bumper during travel of the vehicle.

5. The spare tire carrier claimed in claim 1 wherein said mounting plate includes a lock pin, a clevis on said mounting plate, said lock pin insertable through said clevis to limit travel of said bracket about a vertical axis.

6. The spare tire carrier claimed in claim 1 wherein said arm control means includes a lever on said sleeve for grasping by the user and imparting rotation to the sleeve.

7. The spare tire carrier claimed in claim 1 wherein said arm control means is coupled to said arm at a point remote from the ends of the arm and to said bracket at a point offset from where said arm is coupled to said bracket.

8. The spare tire carrier claimed in claim 1 wherein said mounting plate includes a base plate, fastener means attaching said base plate to said mounting plate, a bracket on said base plate, means for coupling said bracket to a frame member of a vehicle.

9. A spare tire and wheel carrier including;
   a mounting plate for attachment to a vehicle, having a bumper
   a bracket carried by said mounting plate for travel about a vertical axis,
   an arm pivotally coupled to said bracket and having a spare tire and wheel engageable member at its distal end, and
   arm control means carried by said bracket for lowering and raising said arm including an extensible member pivotally coupled to said arm, powered means for extending and retracting said extensible member for lowering and raising said arm for spare tire and wheel removal and storage purposes.

10. The spare tire and wheel carrier claimed in claim 9 wherein said extensible member is coupled to said arm at a point remote from the ends of the arm.

11. The spare tire and wheel carrier claimed in claim 9 wherein said mounting plate includes a base plate, fastener means attaching said base plate to said mounting plate, a bracket on said base plate, means for coupling said bracket to a frame member of the vehicle.

12. The spare tire and wheel carrier claimed in claim 9 wherein said arm control means includes a linear actuator.

13. The spare tire and wheel carrier claimed in claim 12 wherein said linear actuator includes an electric motor.

14. The spare tire and wheel carrier claimed in claim 9 wherein said bracket includes parallel plates, terminating in an upward direction to form a clevis to receive said arm control means.

15. The spare tire and wheel assembly claimed in claim 9 additionally including a latch assembly including an arm mounted housing, a plate for attachment to a bumper of the vehicle and having horizontal flange, a catch carried by said housing for subjacent engagement with the flange to confine the housing and the arm against upward displacement from the plate attached to the bumper.

16. The spare tire and wheel assembly claimed in claim 9 additionally including a plate affixed to the distal end of said arm pivotally coupled to said bracket, a support block on said plate having an arcuate surface which may receive the wheel of a spare tire and wheel assembly to support the tire and wheel assembly in a manually rotatable manner to facilitate aligning holes in the wheel with threaded studs on the plate.

17. The spare tire and wheel assembly claimed in claim 16 wherein said support block is of synthetic material to facilitate wheel rotation during alignment.

* * * * *